United States Patent [19] [11] 4,094,780
Iwai et al. [45] June 13, 1978

[54] PROCESS FOR THE LIQUID PHASE OXIDATION OF ORGANIC SUBSTANCE-CONTAINING EFFLUENTS

[75] Inventors: Yasuto Iwai, Takaishi; Masayoshi Okabe, Tokyo; Naotoshi Seki; Atsuhiko Hiai, both of Takaishi; Seiya Iguchi, Yokohama, all of Japan

[73] Assignee: Mitsui Toatsu Chemicals Inc., Tokyo, Japan

[21] Appl. No.: 713,845

[22] Filed: Aug. 12, 1976

[30] Foreign Application Priority Data

| Aug. 14, 1975 | Japan | 50-98077 |
| Aug. 14, 1975 | Japan | 50-98078 |
| Aug. 14, 1975 | Japan | 50-98079 |
| Aug. 14, 1975 | Japan | 50-98080 |

[51] Int. Cl.² ............ C02B 1/34; C02B 1/42
[52] U.S. Cl. ............ 210/38 B; 210/50; 210/63 R; 252/413
[58] Field of Search ............ 210/15, 38 B, 50, 63 R, 210/71; 252/412, 413, 476

[56] References Cited

U.S. PATENT DOCUMENTS

| 3,186,942 | 6/1965 | Benger | 210/63 R |
| 3,196,107 | 7/1965 | Tomic | 210/38 B |
| 3,492,340 | 1/1970 | Aguilo et al. | 252/413 X |
| 3,761,409 | 9/1973 | McCoy et al. | 210/63 R |
| 3,804,756 | 4/1974 | Callahan et al. | 210/63 R X |
| 3,912,626 | 10/1975 | Ely et al. | 210/63 R X |
| 3,936,399 | 2/1976 | Hirai et al. | 210/38 B X |
| 3,960,723 | 6/1976 | Butler | 210/50 X |
| 3,963,611 | 6/1976 | Dardenne-Ankring, Jr. | 210/63 R |

FOREIGN PATENT DOCUMENTS

| 5,047,453 | 4/1975 | Japan | 210/63 R |

Primary Examiner—Charles N. Hart
Assistant Examiner—Robert H. Spitzer
Attorney, Agent, or Firm—Fisher, Christen & Sabol

[57] ABSTRACT

A process for the liquid phase oxidation of an organic substance-containing effluent which comprises subjecting said effluent to a liquid phase oxidation treatment in the presence of a copper catalyst at a copper ion concentration of 50–5000 ppm and also in presence of an ammonium ion concentration of five or more times the copper ion concentration thereby to oxidize the organic substances in the effluent, and recovering the copper catalyst from the treated effluent for reuse. The recovery of the copper catalyst may be effected either by a process in which the copper catalyst is separated as a precipitate or by a process using a resin adsorption.

4 Claims, 3 Drawing Figures

PROCESS FOR THE LIQUID PHASE OXIDATION OF ORGANIC SUBSTANCE-CONTAINING EFFLUENTS

BACKGROUND OF THE INVENTION

1. Field of the Invention

This invention relates to an improved process for the liquid phase oxidation of an organic substance-containing effluent in the presence of a copper catalyst for reducing the chemical oxygen demand (hereinafter referred to as COD) in the effluent and also to a process for the convenient recovery of the employed copper catalyst.

2. Description of the Prior Art

There have been proposed and are known a number of processes for treating effluents containing relatively high concentrations of organic substances. Typical of these processes is a liquid phase oxidation process such as disclosed in U.S. Pat. No. 2,665,249 issued to Frederick J. Zimmerman. If, however, a high rate of oxidation is desired, this liquid phase oxidation process dictates the use of suitable high temperatures in the range of from 232° to 329° C. This presents many problems such as of economy, safety in operation and corrosion of construction materials and apparatus for the plant, so that a process using relatively lower temperatures and relatively lower pressure conditions has been desired.

In recent years, there has been proposed as an improvement of said liquid phase oxidation treatment in order to achieve a higher treating rate, a process using a catalyst together with lower temperature and lower pressure conditions such as disclosed in Japanese patent publication No. 22275/1969 issued to T. Takahashi, in which process organic substances contained in effluent are wet oxidized at a temperature above 160° C. in the presence of copper or a copper compound while continuously blowing a free oxygen-containing gas into the effluent. In this Japanese patent publication, however, there is no particular description regarding the pH range which is effective for the liquid phase oxidation treatment for the effluent.

Under these circumstances, the present inventors have made an intensive study of a process of treating organic substance-containing effluents by liquid phase oxidation under high temperature and high pressure conditions and have found that the liquid phase oxidation treatment should be conducted under neutral or alkaline conditions in consideration of the corrosion problem of the construction materials. However, it has also been found that, in some cases, the copper and/or copper compound catalyst used in the liquid phase catalytic oxidation process does not show any suitable catalytic activity under neutral or alkaline conditions. Further, it has been found that, in practicing the liquid phase catalytic oxidation process on an industrial scale, the copper and/or copper compound catalyst should preferably be removed and recovered from the effluent to such an extent that it will not interfere with a microorganism treatment of the effluent which is ordinarily conducted prior to discharge of the treated effluent from the liquid phase oxidation system. A practical process for the removal and recovery of the copper and/or copper compound catalyst from the treated effluent has not as yet been developed.

SUMMARY OF THE INVENTION

It is therefore an object of the present invention to provide an improved process for the liquid phase oxidation of organic substance-containing effluents in the presence of a copper catalyst, in which the liquid phase oxidation is conducted under neutral or alkaline conditions which are advantageous due to ease in choice of material of construction for the treatment plant.

It is another object of the present invention to provide a process for the liquid phase oxidation of organic substance-containing effluents in the presence of a copper catalyst under neutral or alkaline conditions, under which the copper catalyst shows a satisfactory catalytic effect on the oxidation of the organic substances.

It is still another object of the present invention to provide a process for recovery of the employed copper catalyst in an efficient manner.

It is a further object of the present invention to provide a process for industrially treating organic substance-containing effluents by liquid phase oxidation in the presence of a copper catalyst wherein the amount of copper catalyst in the treated effluent can be reduced to such an extent that microorganism treatment is subsequently feasible without hindrance.

Still further objects will become apparent from the following detailed description taken in conjunction with the drawing, and the following specific examples which, while indicating preferred embodiments of the invention, are given by way of illustration only.

It has been found that the above objects can be attained by a process for the liquid phase oxidation of an organic substance-containing effluent which comprises subjecting the effluent to a liquid phase oxidation treatment in the presence of a copper or copper compound catalyst and also in the presence of ammonia and/or an ammonium salt at a copper ion concentration of 50–5000 ppm and an ammonium ion concentration of at least five times that of the copper ion in pH range of 6.0–10.0, a temperature range of 150°–300° C. and a pressure range of 10–100 kg/cm$^2$, and then recovering the copper and/or copper compound catalyst from the thus treated effluent for reuse, whereby the organic substance-containing effluent can be suitably catalytically treated by liquid phase oxidation under neutral or alkaline conditions and by use of an inexpensive construction material for the plant. Further, the ammonium salt formed in the treated effluent is then double decomposed with a strong alkali and the dissolved gas in the decomposition solution is separated therefrom, followed by adjusting the pH of the decomposition solution to within the range of 4.0–9.0 to separate the dissolved copper catalyst in the form of precipitate. Alternatively, the copper catalyst may be recovered by separating the dissolved gas from the treated effluent and further separating the dissolved copper catalyst by adsorption with a weakly acidic cation exchange resin or a chelate resin. As still another alternative, the above catalyst-separating treatments may be combined for a further complete separation of the copper catalyst from the treated effluent by the step of precipitation of a portion of the dissolved copper catalyst and further separating the remaining copper catalyst by adsorption with a weakly acidic cation exchange resin or a chelate resin. The copper catalyst can be conveniently recovered from the effluent which has been treated by liquid phase oxidation, and then the thus treated effluent can be further subjected to microorganism treatment by a conventional manner for discharge from the treating system, thus making it possible to industrially treat the organic substance-containing effluent by liquid phase oxidation without involving any environmental pollution.

DETAILED DESCRIPTION OF THE INVENTION

Figure 1:
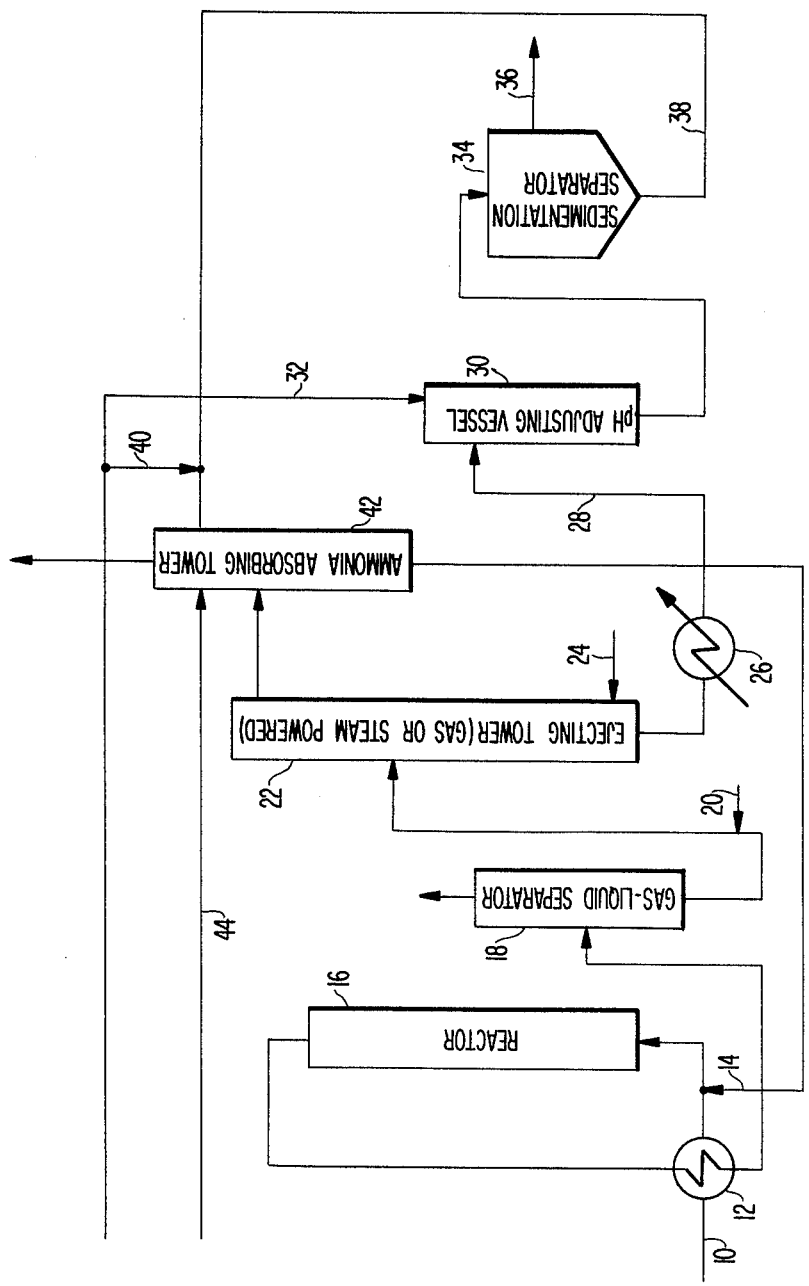
FIGS. 1, 2 and 3 are flowsheets of preferred embodiments for carrying out the liquid phase oxidation process of the present invention.

Among the organic substance-containing effluents which may be treated according to the process of the present invention are various types of effluents having relatively high concentrations of organic substances, e.g., having COD values as high as 10,000–100,000 ppm (when determined by the method prescribed in JIS K-0102-15). Typical effluents are those from various processes for the production of nitriles such as acrylonitrile, methacrylonitrile, etc., by ammoxidation; processes for the production of organic acids such as acetic acid, acrylic acid, methacrylic acid, maleic acid, phthalic acid, etc., by gas-phase catalytic oxidation methods; processes for the production of various esters such as acetic acid esters, acrylic acid esters, methacrylic acid esters, etc.; processes for the production of various alcohols; processes for the treatment of wood and wood products such as in the manufacture of paper pulp; and from refuse and sewage treatments.

In a conventional process for the liquid phase oxidation of an organic substance-containing effluent under high temperature and high pressure conditions in the presence of a copper or copper compound catalyst, the catalytic activity is found to be effective only when the pH of the effluent to be treated is in the acidic range, for example, of about 5.0. However, no catalytic effect is recognized in the pH range of 6.0–10.0 which is advantageous in preventing formation of corrosion on the material of construction for the plant.

In this connection, however, when the liquid phase oxidation treatment is effected according to the process of the invention, using a copper and/or a copper compound catalyst and ammonia and/or an ammonium salt at a copper ion concentration of 50–5000 ppm, preferably 75–1000 ppm and most preferably 100–400 ppm, and an ammonium ion concentration of at least five times that of the copper ion, the COD removal rate may readily reach 80% or more and, in certain cases, up to 99%.

The reaction conditions for the liquid phase oxidation treatment generally employed in the practice of the present invention will suffice when lower in temperature and pressure than those required in known liquid phase non-catalytic oxidation processes. For example, the reaction temperature is generally in the range of 150°–300° C., preferably 210°–260° C., and the pressure is generally in the range of 10–100 kg/cm$^2$G, preferably 40–80 kg/cm$^2$G.

The copper catalysts useful in the present invention include metallic copper and/or copper compounds such as the copper oxides, copper salts of strong inorganic acids including copper sulfate, copper nitrate, copper phosphate, etc., copper salts of halogens including copper chloride, copper bromide, copper fluoride, etc., copper salts of lower saturated monocarboxylic acids including copper formate, copper acetate, etc., copper carbonate and the like. Of the copper salts, the cupric salts are preferred, although in some instances, the cuprous salts may also be used. The copper catalyst is preferably used in the form of powder so as to be readily soluble. Especially when metallic copper is employed as make-up catalyst, it is preferably employed in the form of particles having a size of 1–500 $\mu$. When the metallic copper and/or copper compound catalyst is added to the liquid phase oxidation system, it is dissolved to form copper ions, primarily the cupric ion, and complex ions thereof. Therefore, measurement of the amount of copper catalyst in the system is in terms of copper ion concentration. When the copper ion concentration is below 50 ppm, the catalytic oxidation does not proceed effectively, while with a copper ion concentration above 5000 ppm, a sharp reduction in COD does not occur and therefore use of an excess amount of copper catalyst is not advantageous from an economical point of view.

Although substantially any ammonium salt may be used in the practice of the invention, ammonium phosphate, ammonium sulfate, ammonium carbonate, ammonium bicarbonate, ammonium chloride, ammonium bromide, ammonium fluoride, ammonium nitrate, ammonium acetate, ammonium formate, and the like are generally employed. As described hereinbefore, the amount of ammonia or ammonium salt used is sufficient to provide an ammonium ion concentration of five or more times that of the copper ion concentration in the effluent. That is, although the amount of ammonia or ammonium salt may be varied depending on the kind of effluent, the kind of added ammonium salt, the amount of copper catalyst, the pH of the treating effluent, the reaction conditions including the temperature, etc., it is generally in the range of 250–50,000 ppm, preferably 100–10,000 ppm, as expressed in ammonium ions. In this connection, when there is treated an effluent which contains a large quantity of organic nitrogen therein, e.g., an effluent discharged from a process for the ammoxidation of acrylonitrile, methylmethacrylonitrile or the like, or a process for the production of methylmethacrylate from acetone cyanhydrin, the organic nitrogen is converted to ammonia by the liquid phase oxidation treatment, so that the amount of ammonia or ammonium salt added should be properly varied depending on the amount of the formed ammonia.

When the ammonium ion concentration in the effluent treated by the liquid phase oxidation is less than five times that of the copper ion concentration in the effluent, the employed copper or copper compound does not show a suitable catalytic activity. The ammonium ion concentration in the effluent is preferably in the range of 10–100 times, most preferably 10–60 times, the copper ion concentration. In general, use of an ammonium salt in an effluent in an ammonium ion concentration of greater than 50,000 ppm or greater than 100 times that of the copper ion is economically unfavorable.

Upon the liquid phase oxidation of the organic substance-containing effluent, the pH value of the effluent is generally in the range of 6.0–10.0, preferably 7.0–8.5. Using a pH below 6.0 is unfavorable since the oxidation apparatus and plant will be susceptible to corrosion, while use of a pH above 10 is also unfavorable economically due to consumption of a pH adjusting agent in an unnecessarily large quantity.

The effluent which has been treated by liquid phase oxidation in presence of the copper catalyst and ammonia and/or an ammonium salt in the above-defined amounts, respectively, contains the employed copper catalyst so that it is undesirable to discharge the treated effluent as it is from the treating system. The reasons for this are as follows: organic substance-containing effluents accruing from industrial activity as described hereinbefore are generally large in amount and the discharge of such large amounts of treated effluent results in the loss of a large amount of copper catalyst and is thus poor in economy; discharge of the oxidation treated effluent as it is from the treating system undesirably causes environmental pollution due to wastage of the copper catalyst to the natural world and when the effluent obtained after the liquid phase oxidation treatment is subjected to a microorganism treatment which is often conducted prior to discharge of the oxidation treated effluent to the outside, the dissolved copper catalyst in the effluent tends to hinder the growth of microorganisms, so that reduction in COD value of the effluent by the microorganism treatment can not be attained in a satisfactory manner.

In recent years, the recovery of the copper catalyst from an effluent obtained after a liquid phase oxidation treatment using copper and/or a copper compound as catalyst has been proposed, for example, in Japanese laid-open patent specification No. 84464/1973. In that process, the copper compound in the treated effluent is treated with hydrogen sulfide to precipitate copper sulfide and the thus precipitated sulfide is removed from the effluent. However, the process involves disadvantages in that there is the possibility of causing environmental pollution due to the use of hydrogen sulfide and that sulfides such as copper sulfide are recycled to the reaction system using high temperatures and pressures so that difficulty is encountered in selecting a material for construction of apparatus and treating plant. Accordingly, this known recovery process can not be applied, as it is, to the recovery of copper catalyst from an effluent treated by liquid phase oxidation according to the invention.

In the practice of the present invention, the dissolved copper catalyst may be recovered by several methods. If the allowance of copper concentration in the waste discharged from the effluent treating system is relatively high, the dissolved copper catalyst may be separated and recovered in the form of a precipitate. Alternatively, the dissolved copper catalyst may be recovered by an adsorption treatment. As a matter of course, the precipitation and adsorption recovery processes may be combined for complete copper catalyst recovery. When the combination recovery process is adopted, the dissolved copper catalyst can be substantially completely recovered and recycled to the liquid phase oxidation system for reuse as catalyst, so that the liquid phase oxidation is feasible in a so-called closed system.

The recovery of the dissolved copper catalyst from the oxidation treated effluent will now be described in detail.

One of the preferred copper catalyst recovery processes of the invention comprises adding a strong alkali to the oxidation treated effluent to double decompose the ammonium salt contained therein with the strong alkali, separating the dissolved gases from the resulting decomposition solution, adjusting the decomposition solution to a pH of 4.0-9.0 whereby the dissolved copper catalyst will be precipitated, recovering the thus precipitated copper catalyst from the solution, and recycling the recovered copper catalyst to the oxidation system. Although the recovery percentage will vary depending on the kind of organic substance-containing effluent and the treating conditions when the copper catalyst in the oxidation treated effluent is precipitated and recovered by the process of the invention, the copper catalyst dissolved in the treated effluent can generally be recovered in an amount as high as 70 wt. % when, for example, the effluent from an acrylonitrile production process is used for the liquid phase oxidation treatment. It will be noted that when the precipitation process is combined with the adsorption process, which will be described in detail hereinafter, for the recovery of copper catalyst, the copper catalyst dissolved in the treated effluent may be recovered stepwise, e.g., in an amount of about 30 wt. % by the precipitation process, and then the remaining amount, i.e., 70 wt. %, of the copper catalyst may be recovered by the adsorption process.

Examples of strong alkalis for use in the double decomposition of the ammonium salt contained in the treated effluent include sodium oxide, sodium hydroxide, potassium oxide, potassium hydroxide, magnesium oxide, magnesium hydroxide, lithium oxide, lithium hydroxide, slaked lime, quick lime, sodium carbonate, potassium carbonate, calcium carbonate, magnesium carbonate, lithium carbonate, etc. The amount of strong alkali is generally in an equivalent range of 0.9-1.2, preferably 1.1 equivalents, of ammonium ions. If the amount of strong alkali is smaller than 0.9 equivalent, the amount of ammonia separated in the gas phase is reduced, with a considerable reduction in precipitation rate of the dissolved copper catalyst in the subsequent pH adjusting step. This makes it difficult to recover the dissolved copper catalyst to a satisfactory extent. On the other hand, if the amount of strong alkali is above the above-defined range, an increased amount of alkali carbonate is produced in the treated effluent, resulting in generation of a large amount of carbon dioxide in the subsequent pH adjusting step. The thus generated carbon dioxide rises to the surface of the effluent while entraining therein precipitated copper catalyst, inviting a reduction in recovery percentage of the copper catalyst.

Upon double decomposition of the ammonium salt contained in the oxidation treated effluent with the strong alkali, it will suffice to add the strong alkali to the effluent without resorting to any specific techniques. Generally, the strong alkali is directly added to the treated effluent.

The dissolved gases contained in the decomposition solution can be separated by any ordinarily employed method, for example, a method using an air-ejecting tower or a steam-ejecting tower as a gas separator. In the gas phase separator, the dissolved gases such as ammonia, carbon dioxide, or the like are generally separated in an amount above 70% and, under certain conditions, the separated amount reaches about 90% of the initially dissolved gases. If the dissolved gas is not separated in high amount, the precipitated copper catalyst will be entrained in the rising gas in the pH adjusting step as described hereinbefore, resulting in lowering of the recovery percentage of the precipitated copper catalyst.

The decomposition solution from which the dissolved gases have been separated is adjusted in pH to 4.0-9.0, preferably 6.0-9.0 and most preferably 7.0-8.0. By suitably selecting the pH value, substantially all of the dissolved copper catalyst can be precipitated. For example, when an organic nitrogen-containing effluent is treated by the liquid phase oxidation process according to the present invention, part of copper catalyst in the effluent treated by the liquid phase oxidation is present a copper cyanide. The copper cyanide is readily converted to dissolved copper or copper ions when placed in a high pH region such as a pH of 8. On the other hand, when the decomposition solution from which dissolved gases such as ammonia and carbon dioxide have been removed is adjusted to a pH level of below 4, it becomes substantially impossible to precipitate and separate the copper catalyst as a precipitate. On the other hand, adjustment of the decomposition solution to a pH value above 9.0 undesirably requires that when subjected to, for example, a microorganism treatment, the solution obtained after recovery of the precipitated copper catalyst must be again adjusted to a pH value suitable for the microorganism treatment. This is not economical.

The ammonia separated in the above step is generally absorbed in an aqueous solution of an inorganic acid such as sulfuric acid, nitric acid, or hydrochloric acid, or an organic acid such as formic acid, acetic acid, acrylic acid, maleic acid or phthalic acid, or effluents containing the above-mentioned inorganic or organic acids, thereby recovering the ammonia in the form of an ammonium salt. Alternatively, the separated gas phase may be condensed to recover the ammonia as aqueous ammonia. In some cases, the recovered precipitated copper catalyst may be brought into contact with ammonia in the gas phase, prior to recirculation to the oxidation step for reuse, to convert the precipitated copper catalyst to dissolved copper catalyst and to recirculate the thus converted dissolved copper catalyst.

The liquid phase oxidation and recovery process of the present invention will be particularly illustrated with reference to FIG. 1.

An organic substance-containing effluent and air are fed through line 10 to heat exchanger 12 for heating the effluent up to reaction-commencing temperature. A copper catalyst composed of metallic copper and/or a copper compound and ammonia and/or an ammonium salt in the form of an aqueous solution is fed through line 14 for mixing with the organic substance-containing effluent. The resulting mixture is passed into reactor 16. In the reactor, the effluent is treated by liquid phase oxidation under conditions of, for example, 250° C., 70 kg/cm$^2$(G) and a pH of 8.0. The thus oxidation treated effluent is fed through heat exchanger 12 wherein it is cooled and then fed to gas-liquid separator 18 for separating inert gas therefrom. Thereafter, a strong alkali such as sodium hydroxide is fed, in a mol ratio to ammonium ions of 1.05, from line 20 to gas-liquid separator 18 for double decomposing the ammonium salt. The resulting liquor is passed into ejecting tower 22 into which steam is blown through line 24 located at the bottom of ejecting tower 22. As a result, the gases in the liquor are discharged from the top of tower 22. The bottoms liquor of ejecting tower 22 is cooled in cooling tower 26 and is fed through line 28 to pH adjusting vessel 30. To vessel 30 is fed an acid such as sulfuric acid through line 32 to adjust the pH of the liquor to 7.0, thereby forming a precipitate of the copper catalyst. The thus treated liquor containing the precipitated copper catalyst is fed into sedimentation separator 34 in which the solid matters are separated from the liquid. The supernatant liquid is discharged from line 36. The precipitated copper catalyst sediment at the bottom of separator 34 is continuously withdrawn through line 38 and mixed with sulfuric acid from line 40. The mixture is fed to ammonia-absorbing tower 42 together with make-up copper catalyst from line 44 for contact with the ammonia-containing gas from ejecting tower 22, thereby dissolving the copper catalyst for reuse by recirculation.

The copper catalyst may be likewise recovered from the oxidation treated effluent by separating the dissolved gases from the effluent and subjecting the thus separated effluent to an adsorption treatment with a weakly acidic cation exchange resin or a chelate resin. The recovered copper catalyst may be also recirculated to the oxidation step for reuse. This adsorption recovery process is very advantageous in that the dissolved copper catalyst in the treated effluent can be substantially completely removed by adsorption. Accordingly, the adsorption recovery process is particularly effective when the oxidation treated effluent is necessarily subjected to a microorganism treatment for reduction of the COD value. In general, the copper ion content in the effluent which is allowed for microorganism treatment of the organic substance-containing effluent is as low as about 1 ppm. The adsorption recovery process ensures the copper ion content in the treated effluent will be in the range of less than 1 ppm.

In the adsorption process, the dissolved gases, i.e., acid gases such as carbon dioxide, sulfurous acid gas, etc., in the oxidation treated effluent must be separated or removed to a substantially complete extent, e.g., above 90%. Separation of the dissolved gases is feasible by conventionally employed methods for the separation of gases from liquids, e.g., using an air ejecting tower or a steam ejecting tower. If the dissolved gases are not separated satisfactorily, acid gases such as carbon dioxide or sulfurous acid gas are generated upon being passed through the weakly acidic cation exchange resin or chelate resin and form gas phase areas within the resin packed tower, impeding the copper ion adsorption action of the resin with attendant increase in amount or leaked or escaped copper. Thus, complete recovery of the dissolved copper catalyst can not be attained.

The weakly acidic cation exchange resins useful in the adsorption process are those known as Lewatit CNP-80 and ATO-202 (commercial name of Bayer Chem. Inc.) and Amberlite IRC-50 and IRC-84 (commercial name of Tokyo Yuki K.K.), and the useful chelate resins are those known as Lewatit TP-207, Amberlite XE-318, and Diaion CR-10 (commercial name of Mitsubishi Chem. Co.). As a matter of course, the weakly acidic cation exchange resin or chelate resin may be regenerated, if necessary, by the usual manner.

The adsorption recovery process embodiment of the present invention will be particularly illustrated with reference to FIG. 2.

An organic substance-containing effluent and air are fed through line 10 to heat-exchanger 12 for heating the effluent up to reaction-commencing temperature. A copper catalyst composed of metallic copper and/or a copper compound and ammonia and/or an ammonium salt in the form of an aqueous solution is fed through line 14 to mix with the effluent, followed by introduction of the mixture into reactor 16. In the reactor, the effluent is treated by liquid phase oxidation under conditions of, for example, 250° C., 70 kg/cm$^2$(G) and a pH of 8.0. As a result, the organic substances in the effluent are substantially completely oxidized. The thus treated effluent is fed through heat-exchanger 12 wherein it is cooled and then further cooled in cooling device 26 and fed into gas-liquid separator 18 wherein the inert gas is separated from the effluent. The thus separated effluent is further fed into pH adjusting vessel 30 wherein its pH is adjusted to, for example, 4.0 by use of sulfuric acid from line 32. The thus pH-adjusted effluent is passed into ejecting tower 22 into which air is blown from the bottom thereof from line 50, so that the dissolved gases in the effluent are discharged together with the air. The bottoms liquor from ejecting tower 22 is fed through line 52 and/or line 52' to resin-packed adsorption tower 54 and/or 54'. After adsorption of the copper ion therefrom, the liquor is discharged from line 56 and/or line 56'. The adsorption resin in tower 54 and/or 54' which has adsorbed the copper ion sufficiently, may be regenerated with, for example, 5% sulfuric acid from line 58 and/or 58'. The copper ion-containing sulfuric acid is recovered from line 60 and/or 60' and is neutralized, for example, with aqueous ammonia from line 62. The thus neutralized solution is supplied with make-up copper catalyst from line 44 and is recycled to the reaction system through line 14 for use as an aqueous catalyst solution.

As described hereinbefore, the recovery of copper is also feasible by a combination of the precipitation process and the adsorption process. The combination process is advantageous in that the dissolved copper ion contained in the oxidation treated effluent can be removed to a substantially complete extent, i.e., to a copper ion concentration of less than 1 ppm, by the use of a relatively small-size apparatus, so that the subsequent microorganism treatment is feasible without hindrance. This combination process will be particularly illustrated with reference to FIG. 3.

An organic substance-containing effluent and air are fed through line 10 to heat exchanger 12 in which the effluent is heated up to reaction-commencing temperature. An aqueous catalyst solution is added to the effluent through line 14 and the resulting mixture is fed to reactor 16 in which the effluent is treated by liquid phase oxidation under conditions, for example, of 250° C., 70 kg/cm$^2$(G) and a pH of 8.0. The thus treated effluent is passed through heat exchanger 12 for cooling and then fed into gas-liquid separator 18 for separating inert gas from the effluent. Thereafter, 1.05 mol equivalents of sodium hydroxide with respect to the ammonium salt contained in the effluent is added through line 20 for decomposing the ammonium salt into free ammonia. The effluent is then fed to the top of ejecting tower 22 and at the same time steam is fed into the bottom of tower 22 through line 24 for separating and discharging the dissolved gases from the effluent. The bottoms liquor in ejecting tower 22 is fed to cooler 26 and further to pH adjusting vessel 30, into which is fed sulfuric acid from line 32 to adjust the pH of the fed liquor to, for example, 5.0. As a result, substantially all of the dissolved copper catalyst is precipitated. The thus precipitated copper catalyst is fed to sedimentation separator 34 for separating the precipitated copper catalyst from the liquor. The supernatant liquid is fed to resin-packed adsorption tower 54 for a further complete copper catalyst separation by adsorption. The treated liquid from which the dissolved copper catalyst has been completely removed is discharged from line 56. When the resin-packed adsorption tower reaches its exchange capacity, an acid solution, e.g., an aqueous 5 wt. % sulfuric acid solution, is introduced from line 58 into tower 54 for regeneration. The acid solution employed for the regeneration is fed through line 60 to ammonia-absorbing tower 42 while adding thereto the precipitated copper catalyst separated in sedimentation separator 34 and fed from line 38 and also supplementary make-up catalyst, e.g., copper sulfate, fed from line 44. The dissolved gases separated in ejecting tower 22 are fed into the bottom of ammonia-absorbing tower 42 to allow ammonia contained in the dissolved gases to be absorbed in the acid solution. The thus absorbed solution is withdrawn from tower 42 for use as an aqueous catalyst solution and recycled through line 14 to reactor 16. The unabsorbed gases in ammonia-absorbing tower 42 are exhausted from the top thereof.

The present invention will be particularly illustrated by way of the following examples. In the examples, the COD value of each effluent and the concentration of copper ion were determined in accordance with the methods prescribed in JIS K 0102-5 (1974) and JIS K 0102-37.2 (1974), respectively, which methods will be described hereinbelow.

Method For Measuring COD By Potassium Dichromate

A predetermined amount of sample effluent is introduced into a 250 ml. round bottom flask or Erlenmeyer flask in which 0.4 gram of mercuric sulfate has been previously placed. Then, water is added to the sample to make the total amount of liquid 20 ml., followed by shaking sufficiently to mix thoroughly. Then, 10 ml. of a potassium dichromate solution (N/4) is exactly introduced into the flask and then 30 ml. of a sulfuric acid-silver sulfate solution is carefully charged, followed by shaking to mix and adding boiling stones to the solution. Then, the flask is fitted with a Liebig reflux condenser and the solution content is heated for 2 hours. After cooling the solution, the condenser is washed with about 10 ml. of water and the washings are charged into the flask, followed by diluting the solution with water to about 100 ml. Then, 2-3 drops of an o-phenanthrolineiron (I) salt solution are added as an indicator to the diluted solution and then an excess of dichromic acid is back titrated with an N/4 ammonium iron (II) sulfate solution. The titration is completed at a point where the solution is turned from bluish green to reddish brown.

Then, the above procedure is repeated using 20 ml. of water instead of the sample effluent for a blank test. The oxygen demand by the potassium dichromate is calculated from the following equation:

$$O = (a\text{-}b) \times f \times 1000/V \times 2$$

wherein
 $O$ = oxygen demand (in ppm of oxygen) by potassium dichromate;
 $a$ = amount (ml.) of N/4 ammonium iron (II) sulfate solution required for the blank test;
 $b$ = amount (ml.) of N/4 ammonium iron (II) sulfate solution required for titration;
 $f$ = factor of N/4 ammonium iron (II) sulfate solution; and
 $V$ = amount (ml.) of sample effluent.

Quantitative Determination of Copper By Atomic Absortiometric Method

Copper content is quantitatively determined by the method prescribed in JIS K 0102 (Common Provisions for Atomic Absortiometric Method). Although the range of determination may vary depending on the type of instrument employed, the kinds of burner, combustible gas and oxidative gas, and measuring conditions, use of a wavelength of 324.7 mμ ensures the range of 0.05–4 ppm and a repeated standard deviation percentage of 10–2%. The general procedure, analytical operation, preparation of calibration curve and determination procedure are conducted in accordance with the method of JIS K 0102.

EXAMPLE 1

In this example, the effect of combinations of metallic copper and/or a copper compound as copper catalyst with ammonia and/or an ammonium salt was confirmed by using several kinds of copper catalysts and ammonia or ammonium sulfate in different combinations and amounts as shown in the following Table 1 with respect to the effluent from an acrylonitrile production process employing ammoxidation of propylene.

55 ml. starting effluent of pH 7.0 and COD of 47.0 g/l (as determined by the method prescribed in JIS K 0102-15) was placed in a 200 ml. autoclave, and then air was introduced therein in an amount that was 30% in excess of the theoretical oxygen demand. Then, various combinations of catalyst and ammonia or ammonium sulfate were added to the effluent, followed by a liquid phase oxidation treatment for 1 hour at a temperature of 230° C. under a pressure of 50 kg/cm$^2$ (G).

The test results are shown in Table 1 below.

EXAMPLE 2

The process of the present invention was compared with a known process, with respect to the effluent from a process for the production of methylmethacrylate from acetone cyanhydrin.

256 ml. of starting effluent of pH 8.0 and COD of 1.69 g/l (as determined by the method prescribed in JIS K 0102-15) was placed in a 1000 ml. autoclave, and then air was introduced therein in an amount that was 30% in excess of the theoretical oxygen demand. Then, an oxidation catalyst as shown in Table 2 was added to the effluent for an oxidation reaction for 1 hour at a temperature of 250° C. under a pressure of 70 kg/cm$^2$ (G). The test results are shown in Table 2 below.

TABLE 2

| Added Copper Compound | | Added Ammonium Salt | | Amount of Dissolved Copper Ion (ppm) | COD Removal Rate (%) |
|---|---|---|---|---|---|
| Kind | Amount (ppm as Cu) | Kind | Amount (ppm as NH$_4^+$) | | |
| Copper sulfate | 400 | Ammonium sulfate | 5000 | 270 | 75.7 |
| Copper sulfate* | 400 | nil* | 0 | — | 51.7 |
| nil* | 0 | nil* | 0 | — | 45.3 |

*For Comparison

EXAMPLE 3

A succinic acid-containing effluent discharged from a laboratory was treated in accordance with the process of the present invention.

284 ml. of starting effluent of pH 8.0 and COD of 17.8 g/l (as determined by the method prescribed in JIS K 0102-15) was placed in a 1000 ml. autoclave, and then air was introduced therein in an amount that was 30% in excess of the theoretical oxygen demand. Then, an oxidation catalyst of copper sulfate and ammonium sulfate were added to the effluent for the oxidation reaction at a temperature of 250° C., under a pressure of 70 kg/cm$^2$ (G) for 1 hour. The test results are shown in Table 3 below.

TABLE 1

| Added Copper or Copper Compound | | Added Ammonia or Ammonium Salt | | Amount of Dissolved Copper Ion (ppm) | COD Removal Rate (%) |
|---|---|---|---|---|---|
| Kind | Amount (ppm as Cu) | Kind | Amount (ppm as NH$_4^+$) | | |
| Copper sulfate | 60 | Ammonium sulfate | 650 | 55 | 82.0 |
| Copper sulfate | 100 | Ammonium sulfate | 900 | 93 | 86.4 |
| Copper sulfate | 100 | Ammonium sulfate | 6000 | 95 | 90.2 |
| Copper sulfate | 500 | Ammonium sulfate | 6300 | 467 | 91.1 |
| Copper sulfate | 1000 | Ammonium sulfate | 8500 | 860 | 93.6 |
| Copper oxide | 5000 | Ammonium sulfate | 26300 | 3840 | 95.2 |
| Copper acetate | 1000 | Ammonium sulfate | 5400 | 510 | 89.6 |
| Copper sulfate | 400 | Ammonia | 2500 | 390 | 90.2 |
| Metallic copper powder | 400 | Ammonium sulfate | 3000 | 345 | 88.7 |
| Copper sulfate* | 400 | nil* | 0 | 1.0 | 60.9 |
| Copper sulfate* | 40 | Ammonium sulfate* | 240 | 34 | 72.7 |
| nil* | 0 | nil* | 0 | 0 | 55.6 |
| Copper sulfate* | 1000 | Ammonium sulfate* | 3000 | 245 | 81.5 |
| nil* | 0 | Ammonium sulfate* | 2500 | 0 | 57.1 |

*For Comparison

Table 3 below.

TABLE 3

| Added Copper Compound | | Added Ammonium Salt | | Amount of Dissolved Copper Ion (ppm) | COD Removal Rate (%) |
|---|---|---|---|---|---|
| Kind | Amount (ppm as Cu) | Kind | Amount (ppm as NH$_4^+$) | | |
| Copper sulfate | 400 | Ammonium sulfate | 5000 | 315 | 85.6 |

TABLE 3-continued

| Added Copper Compound | | Added Ammonium Salt | | Amount of Dissolved Copper Ion (ppm) | COD Removal Rate (%) |
| --- | --- | --- | --- | --- | --- |
| Kind | Amount (ppm as Cu) | Kind | Amount (ppm as $NH_4^+$) | | |
| Copper sulfate | 400 | Ammonium sulfate | 10,000 | 330 | 96.8 |

EXAMPLE 4

The apparatus of FIG. 1 was used for the liquid phase oxidation treatment of an effluent from an acrylonitrile production process.

40.0 l/hr of starting effluent of pH 8.3 and COD of 51.2 g/l (when determined by the method prescribed in JIS K 0102-15) was added with 20 l/hr of an aqueous catalyst solution containing copper sulfate (in an amount of 5,000 ppm as $Cu^{++}$) and ammonium sulfate (in an amount of 25,800 ppm as $NH_4^+$) for the oxidation reaction at 250° C. under a pressure of 70 kg/cm² (G) for a contact time of 1 hour while controlling the oxygen concentration at 5 vol.% at the outlet of the reactor. Then, the thus treated effluent was cooled for separating inert gas therefrom to obtain 35.4 l/hr of treated effluent with a COD of 5.32 g/l. The COD removal amount was 90.8%. Then, 66.7 g. of sodium hydroxide was added to the treated effluent to double decompose the ammonium sulfate, followed by feeding to the steam ejecting tower from the bottom thereof to remove the dissolved gases including ammonia and carbon dioxide from the effluent. As a result, there were obtained 39.3 l/hr of bottoms and 2.1 kg/hr of ejected gas. The concentration of ammonia in the ejected gas was 16.8 wt.%. When the bottoms in the ejecting tower were adjusted to a pH level of 7.0, the concentration of dissolved copper ion in the bottoms was reduced to a level of 37 ppm, and 8.55 g/hr of precipitated copper catalyst was recovered. 2 l/hr of a slurry containing all of the precipitated copper catalyst was added with 74.2 g/hr of sulfuric acid and contacted with the gas from the ejecting tower. When the resulting solution was recycled to the oxidation step for reuse as catalyst, the COD removal reached 90.8%.

REFERENCE EXAMPLE 1

In Example 4, different amounts of sulfuric acid were added to the bottoms from the ejecting tower for pH adjustment. The concentrations of dissolved copper ion at the respective pHs are shown in Table 4 below wherein said concentrations were determined by the atomic absortiometric method prescribed in JIS K 01-37.2

TABLE 4

| | pH | Concentration of Dissolved Copper Ion (ppm) |
| --- | --- | --- |
| Treated Effluent Bottoms from Ejecting Tower | 8.4 | 238 |
| Bottoms with Different Amounts of Sulfuric Acid Added for pH Adjustment | 10.4 | 58 |
| | 9.0 | 45 |
| | 8.0 | 39 |
| | 7.0 | 32 |
| | 6.0 | 47 |
| | 5.0 | 60 |
| | 4.0 | 80 |

TABLE 4-continued

| pH | Concentration of Dissolved Copper Ion (ppm) |
| --- | --- |
| 3.0 | 205 |

EXAMPLE 5

Figure 2:
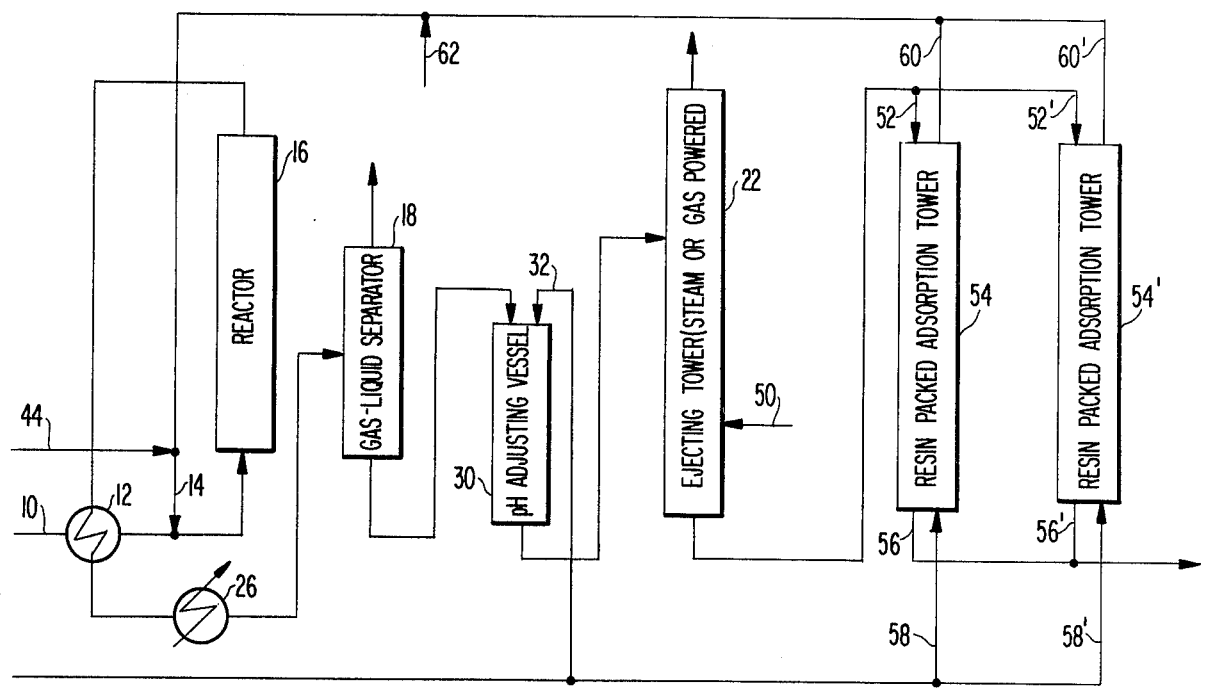

The apparatus of FIG. 2 was used for the liquid phase oxidation treatment of an effluent from an acrylonitrile production process. 40.0 l/hr of effluent of pH 8.3 and COD of 51.2 g/l (when determined by the method prescribed in JIS K 0102-15) was added with 20 l/hr of an aqueous catalyst solution containing copper sulfate (in an amount of 5,000 ppm as $Cu^{++}$) and ammonium sulfate (in an amount of 25,800 ppm as $NH_4^+$) for an oxidation reaction of 250° C. under 70 kg/cm²(G) for 1 hour while controlling the oxygen concentration at 3-5 vol. % at the outlet of the reactor. The reaction solution was cooled and inert gas was separated from the solution to obtain 35.4 l/hr of treated effluent with a COD of 5.32 g/l. The COD removal amount was 90.8%. Then, the treated effluent was adjusted to a pH level of 6.0 and dissolved gases were removed by means of 900 l/hr of air. The resulting solid matters were separated by precipitation to obtain 32.7 l/hr of a supernatant solution with a copper ion concentration of 233 ppm. The supernatant solution was passed into a tower packed with 500 cc. of a chelate resin (Lewatit TP 207) at a rate of 32.7 l/hr. As a result, there was obtained treated water having an average copper ion concentration of 0.56 ppm, thereby recovering the dissolved copper catalyst almost completely. When the used resin was regenerated with 1.8 l of 5% sulfuric acid, the copper ion concentration in the aqueous sulfuric acid solution used for the regeneration was 4,150 ppm and 7.47 g. of copper was recovered. To the copper-containing aqueous sulfuric acid was added aqueous ammonia for neutralization, after which 2.53 g. of metallic copper, 79 g. of ammonium sulfate and water were added thereto to prepare 2 l. of an aqueous catalyst solution (containing 5,000 ppm of copper ion and 25,800 ppm of ammonium ion) for use as catalyst by recirculation. As a result, the COD removal amounted to 90.3% which is substantially the same level as the above removal amount.

REFERENCE EXAMPLE 2

The treated water obtained in Example 5 was adjusted to a pH level of 6.0 without passing through the air ejecting tower, and the solid matters were separated by sedimentation. 33.1 l/hr. of the resulting supernatant liquid was passed into a tower packed with 500 cc. of a chelate resin (Lewatit TP 207). As a result, bubbles were generated within the tower and the copper ion concentration in the treated effluent was 23 ppm on the average.

EXAMPLE 6

Figure 3:
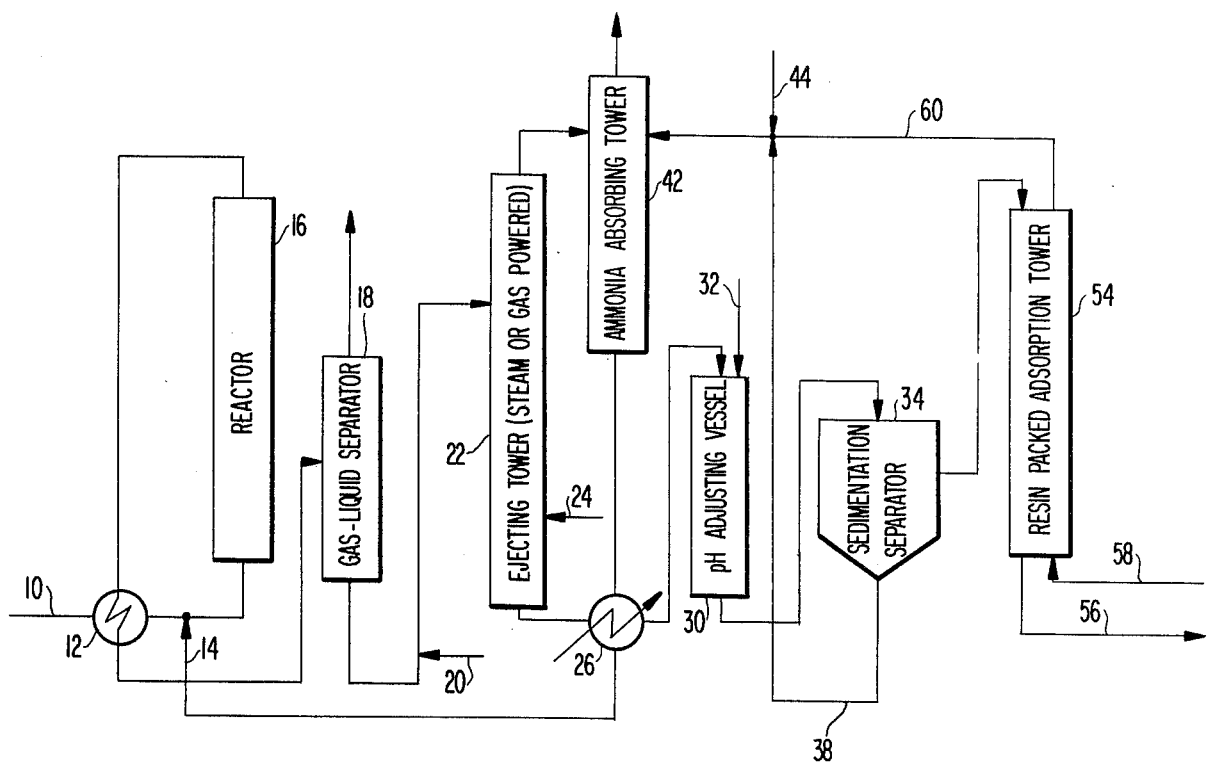

The apparatus of FIG. 3 was used for the liquid phase oxidation treatment of an effluent from an acrylonitrile production process.

40 l/hr. of effluent of pH 7.9 and COD of 49.8 g/l (as determined by the method prescribed in JIS K 0102-15) was added with 2 l/hr of aqueous catalyst solution containing 5,000 ppm of copper ion and 121,000 ppm of ammonium ion from ammonium sulfate for the oxidation reaction at 250° C. under a pressure of 70 kg/cm$^2$ (G) for 1 hour while controlling the oxygen concentration at 5 wt. % at the outlet of the reactor. Then, the reacted effluent was cooled and inert gas was separated from the effluent to obtain 37.6 kg/hr of treated effluent with a COD of 5.16 g/l. The COD removal was 90.3%. The effluent obtained by the liquid phase oxidation treatment was added with 66.7 g/hr of sodium hydroxide to double decompose the ammonium sulfate, followed by feeding to a steam ejecting tower. 6 kg/hr of steam was blown into the tower from the bottom thereof to remove ammonia and carbon dioxide therefrom. As a result, 41.2 l/hr of bottoms and 2.4 kg/hr of ejected gas were obtained, respectively. The ammonia concentration in the ejected gas was 15.2 wt. %. When the bottoms from the ejecting tower was adjusted to a pH level of 5.0, the dissolved copper ion concentration in the bottoms was reduced to 71 ppm. The resulting precipitated copper catalyst was separated by means of a thickener to recover 7.03 g/hr of the precipitate. 40.3 l/hr of the supernatant liquid from the thickener was passed into a tower packed with 500 cc. of a chelate resin (Lewatit TP 207) to obtain treated water with an average copper ion concentration of 0.78 ppm. When the used resin was regenerated with an aqueous 10 wt. % sulfuric acid solution, the copper ion concentration in the aqueous sulfuric acid solution used for the regeneration was 1,580 ppm, 2.85 g. of copper being recovered. To the aqueous sulfuric acid solution were added 0.9 l/hr of the precipitated copper catalyst-containing slurry from the thickener and also 0.66 g/hr of supplementary copper sulfate ($CuSO_4.5H_2O$), which was fed to an ammonia-absorbing tower to allow the mixture to absorb ammonia whereby there was obtained an aqueous catalyst solution containing 5,000 ppm of copper ion and 121,000 ppm of ammonium ion from ammonium sulfate.

What is claimed is:

1. A process for the liquid phase oxidation of an organic substance-containing effluent comprising oxidizing said effluent at a pH range of 6.0 to 10.0 and at a temperature of 150° to 300° C and under a pressure of 10 to 100 kg/cm$^2$ in the presence of an oxidation catalyst system composed of a copper catalyst having a copper ion concentration of 50 to 5000 ppm and an ammonium ion concentration of at least five times that of the copper ion and then recovering said copper catalyst from the treated effluent by double-decomposing the ammonium salt contained in said treated effluent with strong alkali, separating more than 70 weight percent of the dissolved gases from the decomposition solution by ejection with air or steam, adjusting the pH of the ejected decomposition solution to a level of 4.0 to 9.0 whereby dissolved copper catalyst therein is precipitated, and separating the thus precipitated copper catalyst from the solution.

2. The process according to claim 1 wherein said ejected decomposition solution is adjusted to a pH level of 6.0–9.0.

3. The process according to claim 1 wherein after separating the precipitated copper catalyst from the solution the solution is contacted with a weakly acidic cation exchange resin or a chelate resin to adsorb copper catalyst dissolved therein.

4. The process according to claim 3 wherein the ratio of copper catalyst separated as precipitated copper catalyst to copper catalyst separated by adsorption is in the range of 70:30 to 30:70.